(12) United States Patent
Koo et al.

(10) Patent No.: US 7,310,303 B2
(45) Date of Patent: Dec. 18, 2007

(54) RANGING METHOD FOR MOBILE COMMUNICATION SYSTEM BASED ON ORTHOGONAL FREQUENCY DIVISION MULTIPLE ACCESS SCHEME

(75) Inventors: Chang-Hoi Koo, Songnam-shi (KR); Dong-Seek Park, Songnam-shi (KR); Pan-Yuh Joo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1007 days.

(21) Appl. No.: 10/413,010

(22) Filed: Apr. 14, 2003

(65) Prior Publication Data
US 2003/0198179 A1  Oct. 23, 2003

(30) Foreign Application Priority Data
Apr. 22, 2002  (KR) .................. 10-2002-0022841

(51) Int. Cl.
*H04J 11/00* (2006.01)
*H04B 7/216* (2006.01)

(52) U.S. Cl. .................. 370/206; 370/335; 370/342
(58) Field of Classification Search .............. None
See application file for complete search history.

(56) References Cited

U.S. PATENT DOCUMENTS

| 5,694,389 A | 12/1997 | Seki et al. |
| 6,035,003 A * | 3/2000 | Park et al. ............ 375/326 |
| 6,215,792 B1 | 4/2001 | Abi-Nassif |
| 6,628,697 B1 * | 9/2003 | Douglas et al. ........ 375/139 |

FOREIGN PATENT DOCUMENTS

| DE | 198 45 057 A1 | 9/1998 |
| GB | 2 330 729 | 4/1999 |
| WO | WO 01/05051 A1 | 1/2001 |

OTHER PUBLICATIONS

Preliminary Search Report dated Dec. 12, 2003 issued in a counterpart application, namely Appln. No. 0304884000.
Markarian et al., OFDM Mode for the IEEE 802.16a PHY Draft Standard, IEEE 802.16 Broadband Wireless Access Working Group, May 17, 2001, pp. 41-42.

* cited by examiner

*Primary Examiner*—Chi Pham
*Assistant Examiner*—Soon D. Hyun
(74) *Attorney, Agent, or Firm*—The Farrell Law Firm (57) ABSTRACT

Disclosed herein is a ranging method for a mobile communication system based on an OFDMA (Orthogonal Frequency Division Multiple Access) scheme. In the communication system for classifying a ranging procedure between a transmission side and reception sides into an initial ranging process, a bandwidth request ranging process, and a periodic ranging process, the ranging method includes the steps of determining the number of initial RCs(ranging codes) for the initial ranging process, the number of bandwidth request RCs for the bandwidth request ranging process, and the number of periodic RCs for the periodic ranging process, determining a backoff value of the periodic RCs according to the number of the periodic RCs, and sending the initial RCs, the bandwidth request RCs, the periodic RCs, and the backoff value of the periodic RCs to the reception sides.

22 Claims, 3 Drawing Sheets

RANGING METHOD FOR MOBILE COMMUNICATION SYSTEM BASED ON ORTHOGONAL FREQUENCY DIVISION MULTIPLE ACCESS SCHEME

PRIORITY

This application claims priority to an application entitled "RANGING METHOD FOR MOBILE COMMUNICATION SYSTEM BASED ON ORTHOGONAL FREQUENCY DIVISION MULTIPLE ACCESS SCHEME", filed in the Korean Intellectual Property Office on Apr. 22, 2002 and assigned Ser. No. 2002-22841, the contents of which is incorporated hereinby reference.

BACKGROUND OF THE INVENTION

1. Field of the Invention

The present invention relates to a ranging method for a BWA (Broadband Wireless Access) system, and more particularly to a ranging method for a mobile communication system using an OFDMA (Orthogonal Frequency Division Multiple Access) scheme.

2. Description of the Related Art

Typically, an OFDMA scheme is defined as a two-dimensional access scheme for combining a TDA (Time Division Access) scheme with a FDA (Frequency Division Access) scheme. In the case of transmitting data using the OFDMA scheme, OFDMA symbols are separately loaded on sub-carriers and transmitted over prescribed sub-channels. A communication system using the OFDMA scheme needs to periodically execute a ranging procedure to correctly establish a time offset between a transmission side, i.e., a Node B, and a reception side, i.e. a UE (User Equipment), and to adjust power between them.

The ranging procedure is classified into an initial ranging process, a bandwidth request ranging process, and a maintenance ranging process(=periodic ranging process), according to its objectives.

A RC(ranging code) for the maintenance ranging process corresponds to a periodic code periodically transmitted to the Node B over the UE. The maintenance ranging process is also called a periodic ranging process.

The objectives of the above three ranging processes have been defined in the IEEE(International Electrotechnical Commission) 802.16.

The ranging procedure needs ranging sub-channels and RCs, and the UE is assigned with a different RC according to the three objectives. However, the standard document prescribed in the IEEE 802.16 does not define a method for allowing the UE to assign the RC to a variety of ranging processes having different usages and a message thereof.

The IEEE 802.16 defines a prescribed scheme wherein a Node B transmits a UL_MAP(Uplink Map) message to a UE to inform the UE of reference information in uplink access. The UL_MAP message informs the UE of various information in the uplink, for example, a UE's scheduling period and a physical channel configuration, etc. The UE receives the UL_MAP message, and executes a ranging-related procedure based on information contained in the UL_MAP message. The UL_MAP message is transmitted to all the UEs of a cell over broadcast data of the Node B.

The UL_MAP message has the following configuration as shown in Table 1.

TABLE 1

| Syntax | Size |
|---|---|
| UL_MAP_Message_Format( ) { | |
|    Management Message Type=3 | 8 bits |
|    Uplink channel ID | 8 bits |
|    UCD Count | 8 bits |
|    Number of UL_MAP elements n | 16 bits |
|    Allocation Start Time | 32 bits |
|    Begin PHY Specific Section { | |
|       for(i=1; i<n; i+n) | |
|          UL_MAP_Information_Element { | Variable |
|             Connection ID | |
|             UIUC | |
|                Offset | |
|          } | |
|       } | |
|    } | |
| } | |

As shown in Table 1, a UL_MAP_Information_Element area serving as an IE (Information Element) area of a UL_MAP message includes a Connection ID(Identifier) area, a UIUC (Uplink Interval Usage Code) area, and an Offset area. The Connection ID area records information indicative of a transmission scheme therein. The transmission scheme is classified into a unicast scheme, a broadcast scheme, and a multicast scheme. The UIUC area records information indicative of the usage of offsets recorded in the offset area. For example, a number of 2 recorded in the UIUC area means that a starting offset for use in the initial ranging process is recorded in the offset areaa number of 3 recorded in the UIUC area means that a starting offset for use in either the bandwidth request ranging or the maintenance ranging process is recorded in the offset area. The offset area records a starting offset value for use in either the initial ranging process or the maintenance ranging process according to the information recorded in the UIUC area.

The conventional UL_MAP message configuration shown in the Table 1 classifies three ranging processes according to the above objectives, but it does not provide RC allocation by which an independent process for each of the three ranging processes becomes available. In other words, although the conventional UL_MAP message configuration generates a ranging mode by the use of PN (Pseudorandom Noise) code segmentation and also generates a RC available for the three objectives, the UE cannot recognize such information, i.e. the ranging mode and the RC. Therefore, it is necessary for the conventional UL_MAP message to execute a RC allocation for independently performing ranging processes having different objectives.

Typically, even an OFDMA communication system makes it possible to generate all of the near and non-line-of-sight conditions in the same manner as in a mobile communication system channel environment using other modulation and access schemes, and contains a partial signal blocking caused by wood which may affect signal attenuation and signal multipath. Therefore, there may occur a signal collision in an initial transmission step, irrespective of the type of ranging process used in a UE, and then a random seed for providing the same backoff value as in an initial access time is adapted for a signal re-access time.

A conventional Node B transmits to the UE a UCD (Uplink Channel Descriptor) message having information indicative of the backoff value in such a way that the UE identifies the backoff value. Such a UCD message will be described in Table 2.

TABLE 2

| Syntax | Size | Notes |
|---|---|---|
| UCD-Message_Format( ) | | |
|     Management Message Type=0 | 8 bits | |
|     Uplink Channel ID | 8 bits | |
|     Configuration Change Count | 8 bits | |
|     Mini-slot size | 8 bits | |
|     Ranging Backoff Start | 8 bits | |
|     Ranging Backoff End | 8 bits | |
|     Request Backoff Start | 8 bits | |
|     Request Backoff End | 8 bits | |
|     TLV Encoded Information for the overall channel | Variable | |
|     Begin PHY Specific Section { | | |
|         for (i=1; i<n ; i+n) | | |
|             Uplink_Burst_Descriptor | Variable | |
|         } | | |
|     } | | |
| } | | |

As shown in Table 2, the Node B transmits to the UE a UCD message having information indicative of a backoff value available for a re-access time provided after the lapse of an access failure time of the UE. In other words, the backoff value indicates a kind of standby time being a duration time between the start of UE's access failure time and the start of UE's re-access time. The Node B transmits to the UE the backoff values indicating standby time information for which the UE must wait for the next ranging process after failing to execute an initial ranging process. For example, for a number of 10 determined by the above syntaxes of the "Ranging Backoff Start" and the "Ranging Backoff End" shown in the Table 2, the UE must pass over the $2^{10}$-times access executable chances (i.e., 1024-times access executable chances) and then execute the next ranging process according to the Truncated Binary Exponential Backoff Algorithm. In more detail, because the UE receives a UL_MAP message and its ranging access time corresponds to a 1025-th access time, a ranging operation can be executed at the 1025-th access time. However, as stated above, a RC is differently assigned to a UE according to the three ranging processes and is also dynamically assigned to the UE according to a cell status, such that a backoff value transmitted with the UCD message must be differently assigned to the UE according to the objectives of RCs.

In conclusion, a communication system using an OFDMA scheme classifies its ranging procedure into three kinds of ranging processes according to its objective. Although a RC can be differently assigned to the three ranging processes, the UE is unable to identify information indicative of the type of ranging process and is thereby unable to execute an independent ranging operation. The conventional communication system using the OFDMA scheme cannot execute dynamic allocation which is variable with a cell status and a UE's access characteristics because the UE cannot identify such ranging type information, thereby increasing the number of ranging access times of the UE's ranging procedure. As a result, the conventional communication system using the OFDMA scheme has a disadvantage in that it unavoidably increases the length of access delay time and reduces overall system performance.

SUMMARY OF THE INVENTION

Therefore, the present invention has been made in view of the above problems, and it is an object of the present invention to provide a method for dynamically assigning different RCs to a UE according to ranging objectives of the UE in a communication system using an OFDMA scheme.

It is another object of the present invention to provide a method for assigning a RC to a UE for minimizing the length of ranging access time in a communication system using an OFDMA scheme.

It is yet another object of the present invention to provide a method for dynamically assigning a backoff value of a RC for use in a UE according to a cell status in a communication system using an OFDMA scheme.

It is yet another object of the present invention to provide a method for dynamically assigning different backoff values to a UE according to the type of RC in a communication system using an OFDMA scheme.

In accordance with one aspect of the present invention, the above and other objects can be accomplished by the provision of a method for classifying a ranging procedure between a transmission side and reception sides into an initial ranging process, a bandwidth request ranging process, and a periodic ranging process, and allowing the transmission side to send RCs and their backoff values for use in each ranging process to the reception sides, the method including the steps of determining the number of initial RCs for the initial ranging process, the number of bandwidth request RCs for the bandwidth request ranging process, and the number of periodic RCs for the periodic ranging process; determining a backoff value of the periodic RCs according to the number of the periodic RC; and sending the initial RCs, the bandwidth request RCs, the periodic RCs, and the backoff value of the periodic RCs to the reception sides.

In accordance with another aspect of the present invention, there is provided a method for classifying a ranging procedure between a transmission side and reception sides into an initial ranging process, a bandwidth request ranging process, and a periodic ranging process, and allowing the transmission side to send RCs and their backoff values for use in each ranging process to the reception sides, the method including the steps of detecting a congestion level of a current cell, if the detected congestion level of the cell is over a prescribed congestion level, controlling the number of the initial RCs for the initial ranging process to be less than either the number of the bandwidth request RCs for the bandwidth request ranging process or the number of the periodic RCs for the periodic ranging process, and varying a backoff value of the periodic RCs; and sending the initial RCs, the bandwidth request RCs, and the periodic RCs, and the backoff value of the periodic RCs to the reception sides.

In accordance with yet another aspect of the present invention, there is provided a method for classifying a ranging procedure between a transmission side and reception sides into an initial ranging process, a bandwidth request ranging process, and a periodic ranging process, and varying the number of RCs for use in each ranging process in a cell of which the number of total RCs to be used for the ranging processes is predetermined, the method including the steps of allowing the transmission side to determine the number of initial RCs for the initial ranging process, the number of bandwidth request RCs for the bandwidth request ranging process, and the number of periodic RCs for the periodic ranging process, and determining a backoff value of the periodic RCs according to the number of the periodic RCs; sending the initial RCs, the bandwidth request RCs, the periodic RCs, and the backoff value of the periodic RCs to the reception sides; and after receiving the initial RCs, the bandwidth request RCs, the periodic RCs, and the backoff value of the periodic RCs, allowing the reception sides to select a RC corresponding to their current target ranging process, and executing a ranging process corresponding to the selected RC.

In accordance with yet another aspect of the present invention, there is provided a method for classifying a ranging procedure between a transmission side and reception sides into an initial ranging process, a bandwidth request ranging process, and a periodic ranging process, and varying the number of RCs for use in each ranging process in a cell of which the number of total RCs to be used for the ranging processes is predetermined, the method including the steps of detecting a congestion level of a current cell, if the detected congestion level of the cell is over a prescribed congestion level, controlling the number of the initial RCs for the initial ranging process to be less than either the number of the bandwidth request RCs for the bandwidth request ranging process or the number of the periodic RCs for the periodic ranging process, and varying a backoff value of the periodic RCs; sending the initial RCs, the bandwidth request RCs, and the periodic RCs, and the backoff value of the periodic RCs to the reception sides; and after receiving the initial RCs, the bandwidth request RCs, the periodic RCs, and the backoff value of the periodic RCs, allowing the reception sides to select a RC corresponding to their current target ranging process, and executing a ranging process corresponding to the selected RC.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may obscure the subject matter of the present invention.

Figure 1:
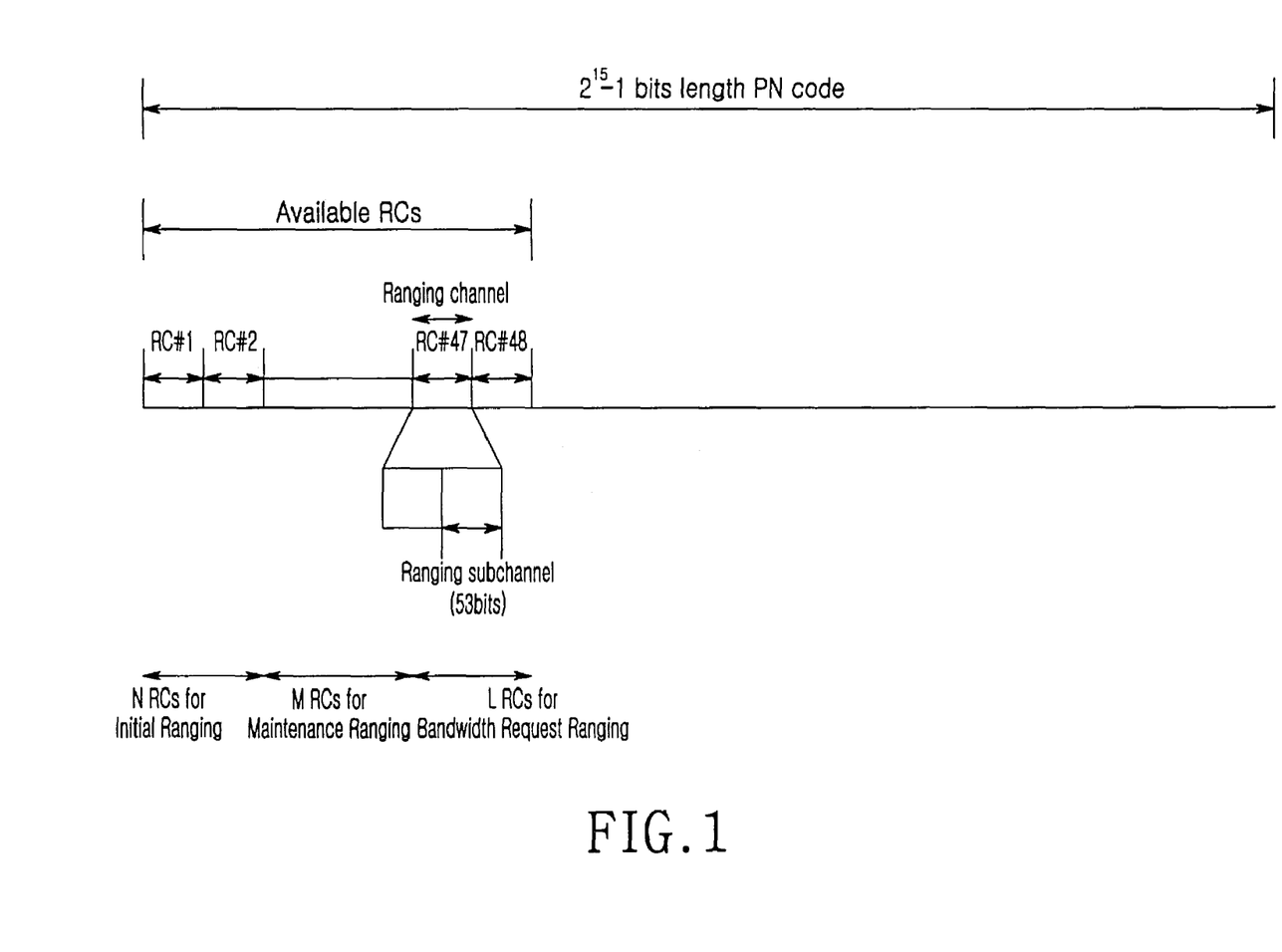
FIG. 1 is a diagram illustrating a ranging code allocation procedure for a communication system based on an OFDMA scheme in accordance with a preferred embodiment of the present invention.

FIG. 1 is a diagram illustrating a RC(Ranging Code) allocation procedure for a communication system based on an OFDMA(Orthogonal Frequency Division Multiple Access) scheme in accordance with a preferred embodiment of the present invention.

With reference to FIG. 1, a RC is created by segmenting a PN(Pseudorandom Noise) code having a prescribed length, for example, the length of $2^{15}-1$ bits, in prescribed units. Typically, one ranging channel is composed of two ranging sub-channels each having the length of 53 bits. A RC is created by such a PN code segmentation over a ranging channel of 106 bits. A maximum of 48 RCs RC(Ranging Code)#1~RC#48 can be assigned to a UE(User Equipment). More than two RCs for every UE are applied as a default value to the three ranging processes having different objectives, i.e. an initial ranging process, a bandwidth request ranging process, and a maintenance ranging(=periodic ranging) process. These ranging processes and their functions are the same as those in the aforementioned prior art. Particularly, a RC for use in the maintenance ranging process corresponds to a periodic code periodically transmitted to the Node B over the UE, such that the maintenance ranging process is also called the periodic ranging process. Therefore, a RC is differently assigned to a UE according to each objective of the three ranging processes. That is, referring to FIG. 1, N RCs are assigned to a UE for the initial ranging process as denoted by a prescribed term of "N RCs for Initial Ranging" in FIG. 1, M RCs are assigned to a UE for the maintenance ranging process as denoted by a prescribed term of "M RCs for maintenance ranging", and L RCs are assigned to a UE for the bandwidth request ranging process as denoted by a prescribed term of "L RCs for Bandwidth-request ranging". The RC for the maintenance ranging process is a prescribed code periodically transmitted from the UE to the Node B, such that it is also called a periodic code.

The standard document prescribed in the IEEE (International Electrotechnical Commission) 802.16 currently defines the maximal number of RCs that can be allocated to the UE and a prescribed default value also allocated to the UE, but it does not describe a detailed method for assigning such RCs to the UE therein. Therefore, the UE is unable to identify reception RC information, such that it is unable to execute an adaptive operation in the case of either a signal collision between transmission RCs or other ranging-related procedures. In order to solve these problems, the present invention proposes a RC allocation method as well as a method for reducing a UE's access delay time by assigning an independent backoff value to each RC, and their detailed description will hereinafter be described.

In more detail, the present invention classifies RCs according to the aforesaid three objectives, and informs a UE of the range of RCs currently available for the UE, resulting in a minimum access delay time. In this case, a message indicative of such classification and range of the RC is a UL(Uplink)_MAP message, and this UL_MAP message has the following configuration as shown in Table 3.

TABLE 3

| Syntax | Size |
| --- | --- |
| UL_MAP_Message_Format( ) { | |
|     Management Message Type=3 | 8 bits |
|     Uplink channel ID | 8 bits |
|     UCD Count | 8 bits |
|     Number of UL_MAP elements n | 16 bits |
|     Allocation Start Time | 32 bits |
|     Begin PHY Specific Section { | |
|         for(i=1; i<n; i+n) | |
|             UL_MAP_Information_Element { | Variable |
|                 Connection ID | |
|                 UIUC | |
|                     Offset | |
|                     Initial Ranging code | |
|                     Bandwidth request Ranging code | |
|                     Maintenance Ranging code | |
|             } | |
|         } | |
|     } | |
| } | |

As shown in Table 3, one UE is assigned with 48 RCs as a maximum RC number. Provided that at least two RCs from among the 48 RCs are assigned to the UE as a specific RC for each of the three ranging objectives, the UE is assigned with 6 RCs in total. Such RCs are differently assigned for every ranging objective, one UE is assigned more than two RCs corresponding to each RC for the three ranging objectives, and the maximal number of 48 RCs is available for the one UE. In other words, the UL_MAP message shown in Table 3 contains an initial RC for the initial ranging process, and a periodic RC such as a bandwidth-request RC and a maintenance RC, which is transmitted to the UE. Therefore, the UE receiving the UL_MAP message is able to use a proper RC in response to its own current ranging objective. Also, the Node B dynamically assigns RCs to the UE according to a current cell status. For example, provided that a small number of UEs are interconnected (hereinafter referred to as the connected-state UEs) within a cell, the Node B may assign many RCs (i.e. initial RCs) for use in the initial ranging process to the UEs during an initialization time. Provided that a large number of connected-state UEs are contained in a cell, the Node B may reduce the number of RCs assigned the initial RCs. In brief, the Node B dynamically assigns RCs to each UE according to a congestion state within a cell. Such a dynamic RC allocation may be adapted to control the cell's congestion state and cell priority. The RC allocation is variable with a cell status, resulting in reduction of a UE's access delay time.

A UCD (Uplink Channel Descriptor) message for differently setting up a backoff value according to the type of RCs will be hereinafter described with reference to Table 4.

TABLE 4

| Syntax | Size | Notes |
|---|---|---|
| UCD-Message_Format( ) | | |
|     Management Message Type=0 | 8 bits | |
|     Uplink Channel ID | 8 bits | |
|     Configuration Change Count | 8 bits | |
|     Mini-slot size | 8 bits | |
|     Initial Ranging Backoff Start | 8 bits | |
|     Initial Ranging Backoff End | 8 bits | |
|     Bandwidth-request Ranging Backoff Start | 8 bits | |
|     Bandwidth-request Ranging Backoff End | 8 bits | |
|     Maintenance Ranging Backoff Start | 8 bits | |
|     Maintenance Ranging Backoff Endt | 8 bits | |
|     Request Backoff Start | | |
|     Request Backoff End | 8 bits | |
|     Request Backoff Start | 8 bits | |
|     TLV Encoded Information for the overall channel | Variable | |
|     Begin PHY Specific Section { | | |
|         for (i=1; i<n ; i+n) | | |
|             Uplink_Burst_Descriptor | Variable | |
|         } | | |
|     } | | |
| } | | |

As shown in Table 4, the UCD message provides UEs with different backoff values in response to the number of RCs dynamically assigned to the UEs according to the number of connected-state UEs within a cell and the number of UEs attempting to execute an initial access. That is, if RCs having different objectives are assigned with different backoff values, access to UEs contained in the cell is controlled according to a cell status. In this way, access to the UEs is controlled by assigning different backoff values to the UEs, resulting in a minimal access delay time. For example, in the case where 10 RCs are assigned with an initial ranging process over a UL_MAP message and the remaining RCs other than the 10 RCs are assigned with a bandwidth request ranging process and a maintenance ranging process, the probability of a code collision caused by UEs respectively selecting the same RCs as their initial RCs is $\frac{1}{10}$. Therefore, in order to further reduce the probability of such collisions caused by the UEs selecting the same RCs, if a re-access time for which each UE re-accesses RCs for the initial ranging process is divided into a plurality of access time segments, that is, if the UEs each are assigned a high initial ranging backoff value, the probability of access collisions from among the UEs in the initial ranging process can be significantly reduced. Even in the case where the bandwidth request ranging process typically assigned many more RCs than the initial ranging process is assigned a relatively low backoff value lower than the initial ranging backoff value, the probability of UEs collisions in the bandwidth request ranging process can also be reduced because the number of RCs assigned to the bandwidth request ranging process is much more than the number of other RCs assigned to the initial ranging process. In this way, an access time of each UE is shortened by reducing a backoff value for use in the bandwidth request ranging process.

The Node B for executing a RC allocation and a backoff value allocation according to a ranging objective will hereinafter be described with reference to FIG. 2.

Figure 2:
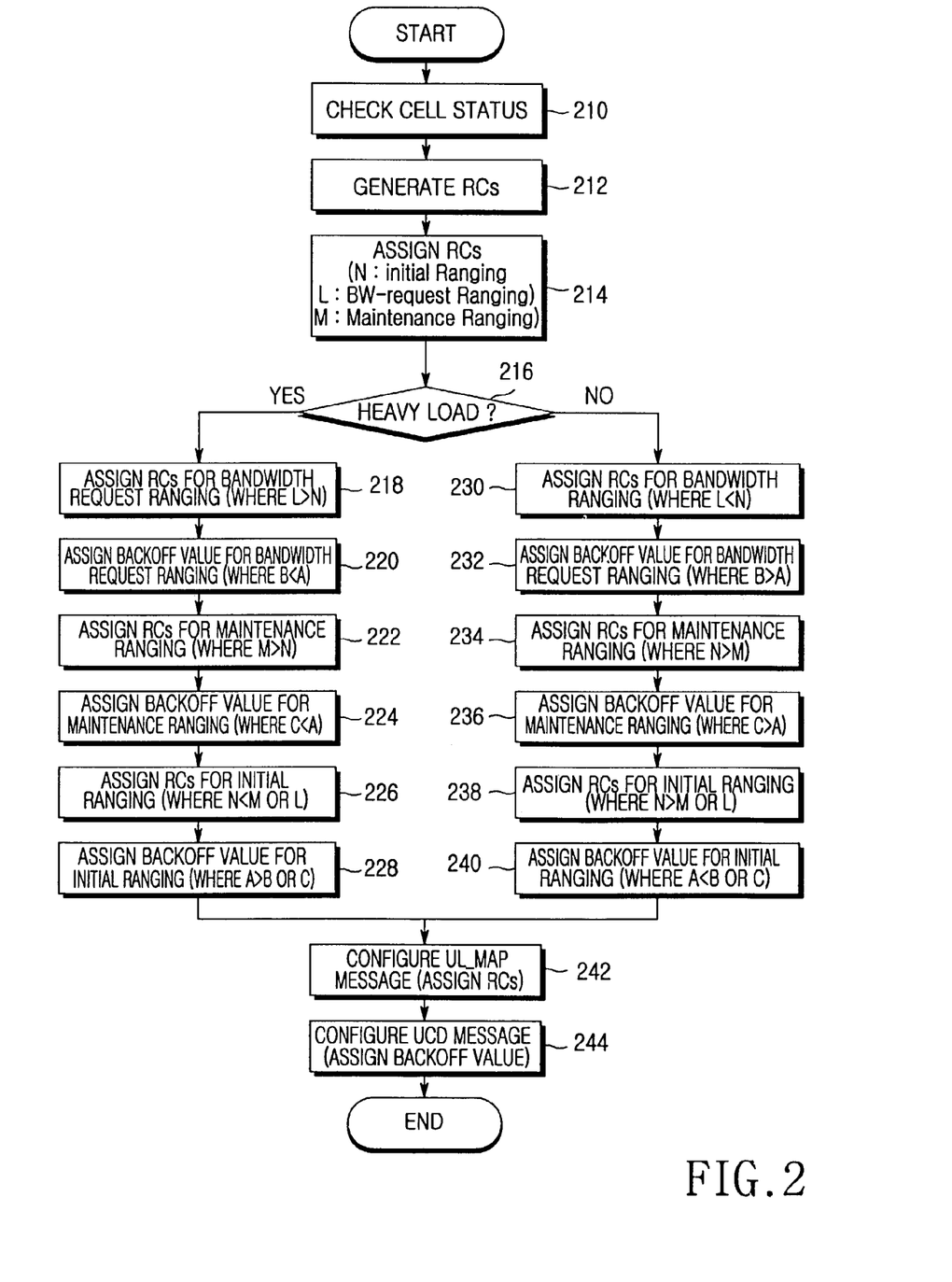
FIG. 2 is a flow chart illustrating a procedure for assigning a ranging code and a backoff value to each ranging process according to a ranging objective of a Node B in accordance with a preferred embodiment of the present invention.

FIG. 2 is a flow chart illustrating a procedure for assigning a RC and a backoff value to each ranging process according to a ranging objective of a Node B in accordance with a preferred embodiment of the present invention.

Referring to FIG. 2, the Node B checks its own cell status at step 210. In more detail, the Node B checks a congestion state of its own cell on the basis of the number of UEs currently in a traffic state at step 210. The Node B generates RCs at step 212. In more detail, as previously stated in FIG. 1, the Node B generates a plurality of RCs by segmenting a PN code having the length of $2^{15}-1$ bits in predetermined units at step 212. The Node B assigns RCs to be used for three ranging processes having different objectives, i.e. the initial ranging process, the bandwidth request ranging process, and the maintenance ranging process, to the three ranging processes, respectively, at step 214. In more detail, as previously stated in FIG. 1, the Node B assigns N number of RCs to the initial ranging process, assigns L number of RCs to the bandwidth request ranging process, and assigns M number of RCs to the maintenance ranging process at step 214. In case of assigning the RCs to each ranging process at step 214, the Node B varies the number of RCs to be used for the initial ranging process, the bandwidth request ranging process, and the maintenance ranging process, according to the cell status checked at step 210. In the case where it is determined at step 216 that the cell is in a heavy load state over a prescribed congestion state, the Node B goes to step 218.

The Node B controls the number L of RCs for the bandwidth request ranging process to exceed the number N of RCs for the initial ranging process and executes RC allocation for the bandwidth request ranging process at step 218 because the cell is in such a heavy load state at step 216, and goes to step 220. That is, the Node B executes RC allocation for the bandwidth request ranging process in a prescribed condition of L>N at step 218. The reason why the Node B provides such a prescribed condition of L>N at step 218 is to minimize the number of collisions caused by the UEs' initial ranging operation, as previously stated above. In more detail, provided that any cell is in a high congestion state, this means that this cell has too much traffic. Therefore, in case of assigning RCs to each ranging process, the Node B controls the number L of RCs to be used for the bandwidth request ranging process to exceed the number N of RCs to be used for the initial ranging process, thereby minimizing the number of uplink access collisions of UEs at step 218. The Node B executes backoff-value allocation for the bandwidth request ranging process at step 220. In this case, provided that a backoff value for the initial ranging code is denoted by a reference character 'A', a backoff value for the bandwidth request ranging code is denoted by a reference character 'B', and a backoff value for the maintenance ranging code is denoted by a reference character 'C', the Node B controls the backoff value of B to be less than the backoff value of A at step 220, that is, provides a prescribed condition of B<A at step 220, and then goes to step 222. The backoff value reduces the length of re-access time caused by access collisions among several UEs in inverse proportion to the backoff value, differently from the number of RCs, thereby minimizing a delay time caused by the uplink access collision of UEs. That is, the lower the backoff value, the shorter the re-access time of the UEs.

The Node B controls the number M of RCs (hereinafter referred to as a maintenance RCs) for the maintenance ranging process to exceed the number N of RCs (hereinafter referred to as initial RCs) for the initial ranging process and executes RC allocation for the maintenance ranging process at step 222, and goes to step 224. The Node B controls the backoff value of C being a maintenance ranging backoff value to be less than the backoff value of A being an initial ranging backoff value at step 224, that is, executes backoff-value allocation for the initial ranging process in a prescribed condition of C<A at step 224, and goes to step 226. The Node B controls the number N of initial RCs to be less than either the number L of bandwidth request RCs or the number M of maintenance RCs and executes the initial RCs' allocation at step 226, and goes to step 228. The Node B controls the initial ranging backoff value of A to exceed either the bandwidth request ranging backoff value of B or the maintenance ranging backoff value of C at step 228, that is, provides a prescribed condition of A>B or C at step 228, and then goes to step 242.

In the meantime, in the case where it is determined at step 216 that the cell is not in the heavy load state over a prescribed congestion state, the Node B goes to step 230. Steps 230~240 are performed in opposition to the above steps 218~228. In more detail, the Node B controls the number L of bandwidth request RCs to be less than the number N of initial RCs and executes RC allocation for the bandwidth request ranging process at step 230 because the cell is in a relatively low congestion state at step 216, and goes to step 232. The Node B controls the bandwidth request ranging backoff value of B to exceed the initial ranging backoff value of A at step 232, that is, provides a prescribed condition of B>A at step 232, and then goes to step 234. The Node B controls the number M of maintenance RCs to be less than the number N of initial RCs at step 234, that is, provides a prescribed condition of M<N at step 234, and goes to step 236. The Node B controls the maintenance ranging backoff value of C to exceed the initial ranging backoff value of A at step 236, that is, executes backoff-value allocation for the maintenance ranging process in a prescribed condition of C>A at step 236, and goes to step 238. The Node B controls the number N of initial RCs to exceed either the number L of bandwidth request RCs or the number M of maintenance RCs at step 238, that is, executes the initial RCs' allocation at step 238 in a prescribed condition of N>M or L at step 238, and goes to step 240. The Node B controls the initial ranging backoff value of A to be less than either the bandwidth request ranging backoff value of B or the maintenance ranging backoff value of C at step 240, that is, executes the backoff-value allocation for the initial ranging process in a prescribed condition of A<B or C at step 240, and then goes to step 242.

The Node B creates a UL_MAP message having a plurality of RCs classified according to ranging objectives shown in Table 3 at step 242, and goes to step 244. In this case, the RCs are classified into an initial RC, a bandwidth request RC, and a maintenance RC, according to such ranging objectives. The Node B inserts backoff values responsive to the type of RCs shown in Table 4 into a UCD message at step 244, and transmits the UL_MAP message and the UCD message having the backoff values to a necessary UE.

The UE for executing a ranging code allocation and a backoff value allocation according to a ranging objective will hereinafter be described with reference to FIG. 3.

Figure 3:
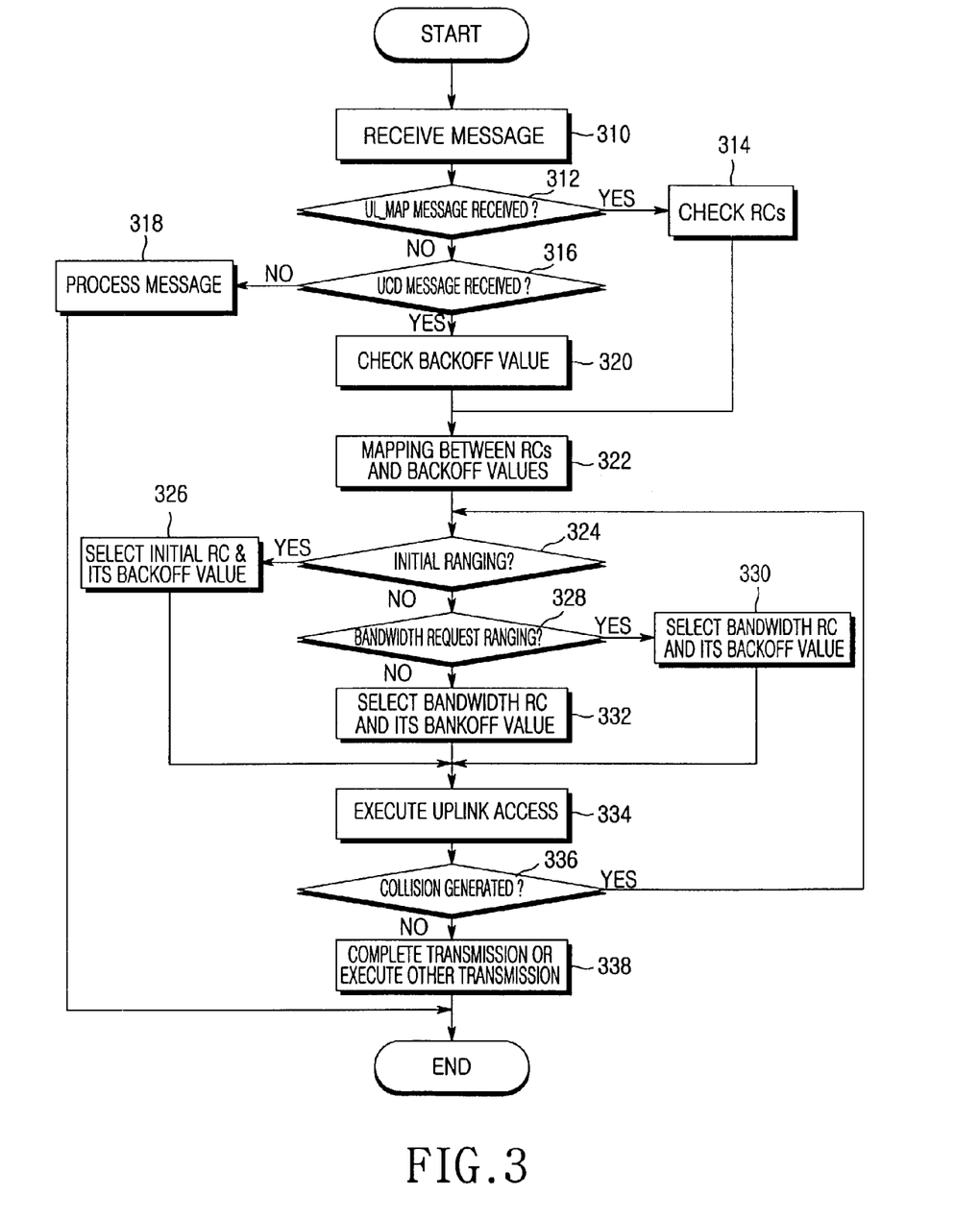
FIG. 3 is a flow chart illustrating a procedure for assigning a ranging code and a backoff value to a UE according to a ranging objective of the UE in accordance with a preferred embodiment of the present invention.

FIG. 3 is a flow chart illustrating a procedure for assigning a RC and a backoff value to a UE according to a ranging objective of the UE in accordance with a preferred embodiment of the present invention.

Referring to FIG. 3, the UE receives a message from the Node B, and goes to step 312. The UE determines at step 312 whether the received message is a UL_MAP message. If the received message is the UL_MAP message at step 312, the UE goes to step 314. The UE analyzes the UL_MAP message to check the RCs, i.e. the initial RC, the bandwidth request RC, and the maintenance RC, at step 314. If these RCs are checked at step 314, then the UE goes to step 322. However, if it is determined that the received message is not the UL_MAP message at step 312, the UE goes to step 316. The UE determines at step 316 whether the received message is a UCD message. If the received message is not a UCD message at step 316, the UE goes to step 318. The UE processes a message corresponding to the received message at step 318, and terminates a program.

In the meantime, if the received message is a UCD message at step 316, then the UE goes to step 320. The UE analyzes the UCD message to check backoff values of RCs contained in the UCD message, i.e. a backoff value of the initial RC, a backoff value of the bandwidth request RC, and a backoff value of the maintenance RC, at step 320, and goes to step 322. The UE establishes the mapping between the checked RCs and their backoff values at step 322, and goes to step 324. The UE determines at step 324 whether its current ranging objective is an initial ranging objective. If it is determined at step 324 that a current ranging objective is the initial ranging objective, the UE goes to step 326. The UE selects at step 326 the initial RC and its backoff value from among the mapping values of step 320, and goes to step 334. If it is determined at step 324 that a current ranging objective is not the initial ranging objective, the UE goes to step 328. The UE determines at step 328 whether a current ranging objective is a bandwidth request ranging objective. If it is determined at step 328 that a current ranging objective is the bandwidth request ranging objective, the UE goes to step 330. The UE selects a bandwidth request RC and its backoff value from among the mapping values at step 330, and goes to step 334. If it is determined at step 328 that a current ranging objective is not the bandwidth request ranging objective, the UE goes to step 332. The UE selects a maintenance RC and its backoff value from among the mapping values at step 332 because a current ranging objective is by elimination the maintenance ranging objective, and goes to step 334.

After the UE selects a current target RC and its backoff value in either one of steps 326, 330, and 332, it executes uplink access with the selected RC and its backoff value at step 334, and goes to step 336. If the UE does not receive a response to the uplink access within a prescribed period of time at step 336, it is determined that a code collision occurs in the uplink access, and returns to step 324. The UE executes successive operations for the uplink access according to a ranging objective and its backoff value at step 324. In the meantime, if the UE receives a response to the uplink access within the prescribed period of time at step 336, it is determined that no collision occurs in the uplink access, i.e. it is determined that a normal uplink access is executed, and then goes to step 338. The UE terminates uplink access transmission or executes other transmission operations at step 338.

As apparent from the above description, a Node B of a communication system based on an OFDMA scheme assigns different RCs and their backoff values to the ranging processes according to ranging objectives, and informs a UE of such allocation result, resulting in a minimal number of uplink access collisions of the UE. The Node B dynamically assigns the number of RCs and their backoff values to the ranging processes according to a cell status and a ranging objective, resulting in a minimal uplink access delay time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of transmitting a number of ranging codes (RCs) and their backoff values for use in each ranging process by a transmission side, to reception sides, wherein a ranging procedure between the transmission side and the reception sides is classified into an initial ranging process, a bandwidth request ranging process, and a periodic ranging process, the method comprising:

determining a number of initial RCs for the initial ranging process, a number of bandwidth request RCs for the bandwidth request ranging process, and a number of periodic RCs for the periodic ranging process;

determining a backoff value of the periodic RCs corresponding to the number of the periodic RCs; and transmitting information of initial RCs corresponding to the determined number of initial RCs, the bandwidth request RCs corresponding to the determined number of bandwidth request RCs, the periodic RCs corresponding to the determined number of periodic RCs, and the backoff value of the periodic RCs to the reception sides.

2. The method as set forth in claim 1, wherein the number of the initial RCs, the number of the bandwidth request RCs, and the number of the periodic RCs are determined by a cell congestion status.

3. The method as set forth in claim 1, further comprising:

determining a backoff value of the initial RCs and a backoff value of the bandwidth request RCs corresponding to the number of the initial RCs and the number of bandwidth request RCs; and transmitting the backoff value of the initial RCs and the backoff value of the bandwidth request RCs to the reception sides.

4. A method of transmitting a number of ranging codes (RCs) and their backoff values for use in each ranging process by a transmission side, to reception sides, wherein a ranging procedure between the transmission side and the reception sides is classified into an initial ranging process, a bandwidth request ranging process, and a periodic ranging process, the method comprising:

detecting a congestion level of a current cell;

determining a number of initial RCs for the initial ranging process, a number of bandwidth request RCs for the bandwidth request ranging process, and a number of periodic RCs for the periodic ranging process;

determining a backoff value of the periodic RCs corresponding to the number of the periodic RCs; and transmitting initial RCs corresponding to the determined number of initial RCs, bandwidth request RCs corresponding to the determined number of bandwidth request RCs, and periodic RCs corresponding to the determined number of bandwidth request RCs, and the backoff value of the periodic RCs to the reception sides, wherein the number of initial RCs is less than the number of bandwidth request RCs or the number of periodic RCs when the detected congestion level of the cell is greater than a prescribed congestion level.

5. The method as set forth in claim 4, wherein the number of initial RCs is greater than the number of bandwidth request RCs or the number of periodic RCs when the detected congestion level of the cell is less than the prescribed congestion level.

6. The method as set forth in claim 4, wherein the backoff value of the periodic RCs varies with the number of the periodic RCs.

7. The method as set forth in claim 4, further comprising:

determining the backoff value of the periodic RCs, and determining a backoff value of the initial RCs and a backoff value of the bandwidth request RCs; and transmitting the backoff value of the initial RCs and the backoff value of the bandwidth request RCs along with the backoff value of the periodic RCs to the reception sides.

8. The method as set forth in claim 7, wherein the backoff value of the initial RCs and the backoff value of the bandwidth request RCs vary with the number of the initial RCs and the number of bandwidth request RCs.

9. A method of ranging, wherein a ranging procedure between a transmission side and reception sides is classified into an initial ranging process, a bandwidth request ranging process, and a periodic ranging process, the method comprising:

determining at the transmission side a number of initial RCs for the initial ranging process, a number of bandwidth request RCs for the bandwidth request ranging process, and the number of periodic RCs for the periodic ranging process, and determining a backoff value of the periodic RCs corresponding to the number of the periodic RCs;

transmitting at the transmission side the initial RCs corresponding to the determined number of initial RCs, the bandwidth request RCs corresponding to the determined number of bandwidth request RCs, the periodic RCs corresponding to the determined number of periodic RCs, and the backoff value of the periodic RCs to the reception sides; and receiving at the reception sides the initial RCs, the bandwidth request RCs, the periodic RCs, and the backoff value of the periodic RCs, selecting a RC corresponding to their current target ranging process, and executing a ranging process corresponding to the selected RC.

10. The method as set forth in claim 9, wherein the number of the initial RCs, the number of the bandwidth request RCs, and the number of the periodic RCs are determined by a cell congestion status.

11. The method as set forth in claim 9, further comprising:
determining at the transmission side a backoff value of the initial RCs and a backoff value of the bandwidth request RCs corresponding to the number of the initial RCs and the number of bandwidth request RCs; and
transmitting at the transmission side the backoff value of the initial RCs and the backoff value of the bandwidth request RCs to the reception sides.

12. The method as set forth in claim 9, further comprising:
when a current target ranging process of the reception sides is the periodic ranging process, executing at the reception sides the periodic ranging process, and then when it is determined that a collision occurs in the periodic ranging process, re-executing the periodic ranging process after the lapse of a predetermined time corresponding to the backoff value of the periodic RCs.

13. The method as set forth in claim 11, further comprising:
when a current target ranging process of the reception sides is the initial ranging process, executing at the reception sides the initial ranging process, and then when it is determined that a collision occurs in the initial ranging process, re-executing the initial ranging process after the lapse of a predetermined time corresponding to the backoff value of the initial RCs.

14. The method as set forth in claim 11, further comprising:
when a current target ranging process of the reception sides is the bandwidth request ranging process, executing at the reception sides the bandwidth request ranging process, and when if it is determined that a collision occurs in the bandwidth request ranging process, re-executing at the reception sides the bandwidth request ranging process after the lapse of a predetermined time corresponding to the backoff value of the bandwidth request RCs.

15. A method of ranging, wherein a ranging procedure between a transmission side and reception sides is classified into an initial ranging process, a bandwidth request ranging process, and a periodic ranging process, the method comprising:
detecting at the transmission side a congestion level of a current cell;
determining at the transmission side a number of initial RCs for the initial ranging process, a number of bandwidth request RCs for the bandwidth request ranging process, and a number of periodic RCs for the periodic ranging process;
determining at the transmission side a backoff value of the periodic RCs corresponding to the number of the periodic RCs;
transmitting at the transmission side initial RCs corresponding to the determined number of initial RCs, the bandwidth request RCs corresponding to the determined number of bandwidth request RCs, and the periodic RCs corresponding to the determined number of bandwidth request RCs, and the backoff value of the periodic RCs to the reception sides; and
receiving at the reception sides the initial RCs, the bandwidth request RCs, the periodic RCs, and the backoff value of the periodic RCs, selecting a RC corresponding to their current target ranging process, and executing a ranging process corresponding to the selected RC,
wherein the number of initial RCs is less than the number of bandwidth request RCs or the number of periodic RCs when the detected congestion level of the cell is greater than a prescribed congestion level.

16. The method as set forth in claim 15, wherein the number of initial RCs is greater than the number of bandwidth request RCs or the number of periodic RCs when the detected congestion level of the cell is less than the prescribed congestion level.

17. The method as set forth in claim 15, wherein the backoff value of the periodic RCs varies with the number of the periodic RCs.

18. The method as set forth in claim 15, further comprising:
determining at the transmission side the backoff value of the periodic RCs, and determining a backoff value of the initial RCs and a backoff value of the bandwidth request RCs; and
transmitting at the transmission side the backoff value of the initial RCs and the backoff value of the bandwidth request RCs along with the backoff value of the periodic RCs to the reception sides.

19. The method as set forth in claim 18, wherein the backoff value of the initial RCs and the backoff value of the bandwidth request RCs vary with the number of the initial RCs and the number of bandwidth request RCs.

20. The method as set forth in claim 15, further comprising:
when a current target ranging process of the reception sides is the periodic ranging process, executing at the reception sides the periodic ranging process, and then when it is determined that a collision occurs in the periodic ranging process, re-executing the periodic ranging process after the lapse of a predetermined time corresponding to the backoff value of the periodic RCs.

21. The method as set forth in claim 18, further comprising:
when a current target ranging process of the reception sides is the initial ranging process, executing at the reception sides the initial ranging process, and when if it is determined that a collision occurs in the initial ranging process, re-executing the initial ranging process after the lapse of a predetermined time corresponding to the backoff value of the initial RCs.

22. The method as set forth in claim 18, further comprising:
when a current target ranging process of the reception sides is the bandwidth request ranging process, executing the reception sides the bandwidth request ranging process, and when if it is determined that a collision occurs in the bandwidth request ranging process, re-executing the bandwidth request ranging process after the lapse of a predetermined time corresponding to the backoff value of the bandwidth request RCs.

* * * * *